United States Patent [19]

McKenzie et al.

[11] Patent Number: 5,482,729
[45] Date of Patent: Jan. 9, 1996

[54] CONTINUOUS PROCESS FOR MANUFACTURING ANIMAL FEED BLOCKS

[76] Inventors: Russell G. McKenzie, 500 Amos; Robert P. Hunt, 101 Sequoyah; Clinton H. Jones, 2302 Central, all of, Poteau, Okla. 74953

[21] Appl. No.: 260,875

[22] Filed: Jun. 16, 1994

[51] Int. Cl.$^6$ ............................... A23K 1/02; A23K 1/18
[52] U.S. Cl. .......................... 426/635; 426/523; 426/658; 426/807
[58] Field of Search ..................................... 426/635, 658, 426/807, 630, 520, 523, 72, 74

[56] References Cited

U.S. PATENT DOCUMENTS

| | | | |
|---|---|---|---|
| 3,246,336 | 4/1966 | Baribo | 426/807 |
| 3,961,081 | 6/1976 | McKenzie | 426/807 |
| 4,221,818 | 9/1980 | Schroeder | 426/635 |
| 4,737,377 | 4/1988 | Lane | 426/807 |
| 4,749,578 | 6/1988 | Benton et al. | 426/807 |
| 4,851,244 | 7/1989 | Theuninck | 426/658 |

OTHER PUBLICATIONS

McGraw–Hill Dictionary of Scientific and Technical Terms—3rd Edition, McGraw–Hill Book Company, New York (1984) p. 403.
"When Nutrition is Critical . . . Feed Crystalyx" Brochure.
"Crystalyx Mineralized Energy Supplement" Brochure.
"Crystalyx Concentrated Horse Supplement" Brochure.

*Primary Examiner*—Michael W. Ball
*Assistant Examiner*—Daniel J. Stemmer
*Attorney, Agent, or Firm*—Hovey, Williams, Timmons & Collins

[57] ABSTRACT

An improved, continuous process for the production of animal feed supplements is provided. Broadly, the process includes continuous preparation of a preblend including molasses and vegetable fat, followed by continuous cooking of the preblend in an elongated cooking zone. The cooked preblend is then continuously treated for removal of moisture and partial cooling thereof, whereupon dry ingredients (e.g., vitamins and protein sources) are added and the resultant feed supplement is continuously cooled and packaged.

14 Claims, 1 Drawing Sheet

CONTINUOUS PROCESS FOR MANUFACTURING ANIMAL FEED BLOCKS

BACKGROUND OF THE INVENTION

1. Field Of the Invention

The present invention is broadly concerned with an improved, continuous process for the manufacture of animal feed supplements. More particularly, the invention pertains to such an improved process wherein, in preferred forms, a molasses-based preblend is continuously passed through an indirect thermal interchange continuous cooker, followed by moisture removal and partial cooling; a dry mixture including vitamins and proteineous ingredients is then added to the cooked preblend, and the resultant feed supplement is further cooled and packaged.

2. Description of the Prior Art

Molasses-based feed supplements have long been used to enhance the diets of livestock, particularly cattle. Such supplements are commonly in the form of a solid block and are placed in a stockyard for ad libitum consumption by the animals. Without known exception, molasses-based feed supplements have in the past been produced on a batch basis. For example, U.S. Pat. No. 4,749,578 describes a process for the manufacture of molasses feed blocks wherein molasses and other ingredients are mixed, cooked, cooled and packaged on a batch basis. This manufacturing technique is inherently costly and time-consuming.

Accordingly, there is a real and unsatisfied need in the art for an improved continuous process for the manufacture of animal feed supplements which is both simple and effective for the production of large quantities of finished feed supplement.

SUMMARY OF THE INVENTION

The present invention overcomes the problems noted above, and provides a continuous process for the manufacture of animal feed supplements, and particularly molasses-based supplements.

Broadly speaking, the process of the invention involves first continuously preparing a preblend including respective amounts of molasses and vegetable fat. Advantageously, this preblend is predominantly molasses, and typically would contain from about 94–97% by weight molasses and from about 3–6% by weight of vegetable oil. In the next step, the preblend at ambient temperature is continuously passed into and through an elongated cooking zone where the preblend is cooked. Such cooking is preferably accomplished via indirect, countercurrent thermal heating; in practice, the cooking zone includes an annular preblend-conveying zone with inner and outer heating fluid-conveying zones respectively disposed adjacent the inner and outer margins of the annular zone. Hot oil or other thermal interchange media is continuously passed in countercurrent relationship to the preblend passing through the annular zone of the cooker. In any case, at the conclusion of the cooking step the preblend should have a temperature of from about 300°–400° F., and more preferably from about 300°–350° F. In order to achieve these temperature conditions using the preferred cooker, the preblend would normally be present in the cooking system for a period of from about 5.5 to 7.1 minutes.

At the conclusion of the cooking step, the cooked material is continuously passed into and through a moisture-removal zone, preferably in the form of a serially connected cyclone separator and vacuumizer tank. This serves to remove moisture from the cooked preblend, and also lowers the temperature thereof. Normally, the moisture content of the cooked preblend is lowered to a level of from about 2–10% by weight (more preferably from about 3–8% by weight), whereas the temperature of the cooked preblend is lowered to a level of from about 150°–225° F. (more preferably from about 160°–200° F.).

In the next step, dry components are added to the preblend to form a substantially homogenous and flowable feed supplement. Such dry components include the usual vitamins and proteineous ingredients, and use can be made of plant and/or animal protein sources. The feed supplement is then continuously cooled and packaged into quantities of desired size. This involves continuously passing the supplement onto an endless, moving belt with a packaging station at the end of the belt. In order to enhance cooling, water is sprayed against the underside of the belt.

DESCRIPTION OF THE PREFERRED EMBODIMENT

Figures 1, 2:
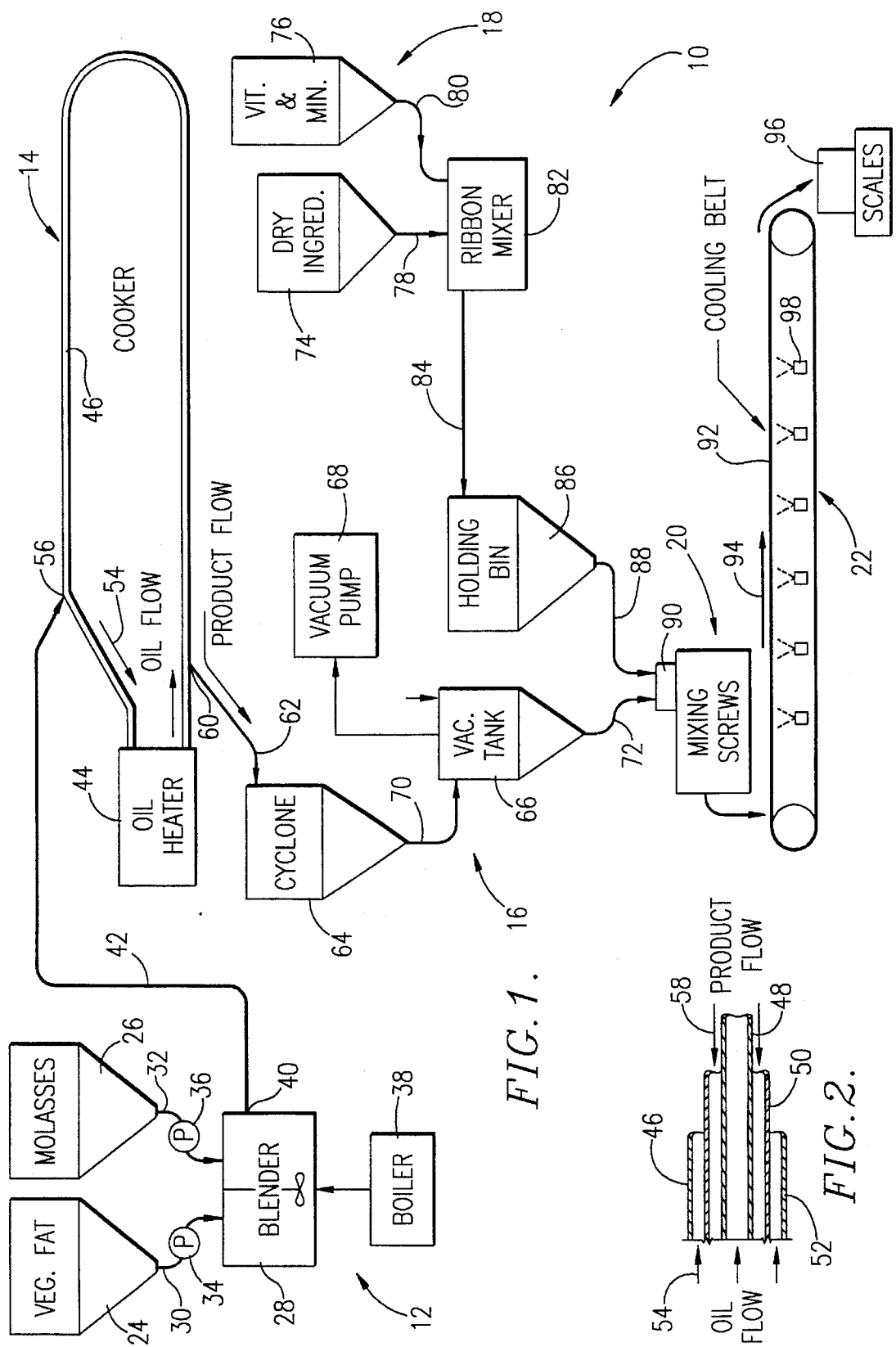
FIG. 1 is a schematic flow diagram illustrating the preferred apparatus and method steps used for the continuous production of animal feed supplements in accordance with the invention.
FIG. 2 is an enlarged, fragmentary view illustrating the construction of the preferred, indirect thermal interchange continuous cooker of the invention.

Turning now to the drawing, and particularly FIG. 1, apparatus 10 for the continuous manufacture of animal feed supplements is illustrated. Broadly, the apparatus 10 includes a preblending assembly 12, a cooker 14, a moisture removal station 16, dry mix preparation assembly 18, blender 20 and cooling/packaging assembly 22.

In more detail, the assembly 12 includes individual, stirred tanks 24 and 26 for holding supplies of vegetable fat (e.g. corn or soy oil) and molasses. The tanks 24, 26 are connected to a liquid blender 28 via lines 30, 32, the latter having variable speed pumps 34, 36 interposed therein. A boiler 38 is also operably coupled with blender 28 in order to supply steam and/or hot water to the blender. The outlet 40 of blender 28 is coupled with a transfer conduit 42 leading to cooker 14.

The cooker 14 is in the form of a continuous, closed loop, indirect thermal interchange device. In detail, the cooker 14 includes an oil heater 44 and a continuous piping system 46 operably coupled with heater 44. Referring specifically to FIG. 2, it will be observed that the piping system 46 includes an innermost, central, oil-conveying pipe 48, an annular preblend-conveying imperforate conduit 50 disposed about pipe 48, and an outermost, annular, oil-conveying pipe 52 disposed about the annular conduit 50. As is apparent from a study of FIGS. 1 and 2, it will be clear that piping system 46 is connected to heater 44 for flow of oil through both pipes 48 and 52, in the direction indicated by arrows 54. However, the preblend from assembly 12 passes through transfer conduit 42 to an inlet 56 in communication with annular conduit 50. Thus, the preblend from blender 28 passes through conduit 42 and thence through conduit 50 in the direction illustrated by arrows 58, i.e., in countercurrent relationship with the flow of oil through pipes 48 and 52. Again referring to FIG. 1, a cooked preblend outlet 60 is provided, the latter being coupled to transfer conduit 62. The outlet 60 is in communication with conduit 50, thereby allowing cooked preblend to pass from cooker 14 to station 16.

The moisture removal station 16 includes a serially interconnected cyclone separator 64 as well as a vacuumizer tank 66 and vacuum pump 68. As will be apparent to those skilled in the art, cooked preblend passes from conduit 62 into and through cyclone 64 for removal of moisture and cooling of the preblend. At this point the underflow from the cyclone separator is transferred via pipe 70 to vacuum tank 66. The vacuum drawn in the tank 66 by pump 68 serves to further cool and dehydrate the cooked preblend. The underflow from tank 66 travels by way of pipe 72 to blender 20.

The assembly 18 includes individual holding tanks 74 and 76 for the dry ingredients and vitamins and minerals desired for incorporation into the feed supplement. The tanks 74, 76 are connected by conduits 78, 80 and appropriate augers (not shown) with a ribbon mixer 82. The output from mixer 82 is conveyed through conduit 84 and a transfer auger (not shown) to a holding bin 86; the latter has a pipe 88 leading to blender 20 as shown.

The blender 20 includes variable speed controls. The outlets of pipes 72 and 88 are in communication with the mixing screws of the blender. The outlet from the mixing screws is in the form of a completed feed supplement which is substantially homogeneous and flowable. This flowable mixture passes from the mixing screws and is deposited onto an endless, moving stainless steel belt 92. The belt moves in the direction illustrated by arrow 94, and thereby serves to continuously deposit cooled feed supplement into drums 96 or other appropriate containers at the end of the belt remote from the mixing screws. Preferably, water is sprayed via heads 98 against the underside of the belt 92, thereby maximizing the cooling effect during passage of the feed supplement along the belt.

In practice, the molasses and vegetable oil in tanks 24, 26 are metered into blender 28 at the preferred ratios noted above, whereupon the molasses and oil are heated with hot water and/or steam. The continuous output from blender 28 in the preferred technique is about 7,670 lb/hour. Since molasses varies in moisture content from area to area and refinery to refinery, the weighing of uncooked molasses causes unstable analysis. In the present invention, the weighing of molasses after it is cooked stabilizes the analysis. The output from blender 28 passes through the cooker 14 which in practice is about 120 feet long. At the end of the cooking step, the preblend has been fully cooked and is at a temperature of about 338° F. Following cooking, the preblend passes through the separator 64 and into vacuum tank 66, the latter having a vacuum of about 21–24 inches of mercury. This causes the release of steam and moisture, to a level of about 5% by weight, along with a lowering of the temperature of the product to about 180° F.

The dry ingredients from tanks 74 and 76 are conveyed by the augers to ribbon mixer 82, the latter resting on an electronic scale. The mixture is held within blender 82 for about five minutes and is then conveyed to holding bin 86.

The cooked preblend in tank 66 is pumped and the dry ingredients in bin 86 are augered into the mixing screw section 26 with both regulated by variable speed controls. The latter is operated to produce about 7,000 to 9,000 lb/hour of substantially homogeneous and flowable product at a temperature of approximately 160° F. The latter is then conveyed on belt 92 for cooling and packaging, the latter occurring at a about five tons per hour, with the product having a temperature of about 130° F. and is in a taffy-like state. Once packaged, the product is set aside for complete cooling to ambient temperature, where it becomes hardened like rock candy.

We claim:

1. A continuous process for the manufacture of an animal feed supplement, comprising the steps of:

continuously preparing a preblend including respective amounts of molasses and vegetable fat;

continuously directing said preblend into and through an elongated cooking zone defined by an imperforate conduit surrounded by an outermost pipe carrying a heated cooking fluid in heat exchanging relationship in said pipe, and cooking said preblend in said conduit;

continuously passing said preblend into and through a moisture-removal zone located downstream from said cooking zone wherein part of the moisture of the preblend is removed;

continuously adding dry components including proteinaceous ingredients to said preblend and forming a substantially homogeneous and flowable feed supplement; and continuously cooling and packaging said feed supplement into quantities of desired size.

2. The process of claim 1, said preblend comprising from about 94–97% by weight molasses, and from about 3–6% by weight vegetable oil.

3. The process of claim 1, including the step of continuously passing said preblend through said elongated cooking zone in a first direction, and simultaneously passing a heating fluid in a second direction countercurrent to said first direction for cooking of said preblend.

4. The process of claim 3, said conduit in said cooking zone including an annular preblend conveying conduit and inner and outer heating fluid conveying pipes respectively disposed adjacent the inner and outer margins of said annular conduit.

5. The process of claim 4, including the step of passing hot oil through said inner and outer heating fluid-conveying pipes.

6. The process of claim 1, including the step of heating said preblend in said cooking zone to a temperature of from about 300°–400° F.

7. The process of claim 6, said temperature being from about 300°–350° F.

8. The process of claim 1, including the step of heating said preblend in said cooking zone for a period of from about 5.5 to 7.1 minutes.

9. The process of claim 1, including the step of continuously passing said cooked preblend through a cyclone separator and vacuumizer for removal of moisture therefrom, and for lowering the temperature of the cooked preblend.

10. The process of claim 9, including the step of operating said cyclone separator and vacuumizer for reducing the moisture content of the cooked preblend to a level of from about 2–10% by weight, and for lowering the temperature of the cooked preblend to a temperature of from about 150°–225° F.

11. The process of claim 10, said moisture content being from about 3–8% by weight, and said temperature being from about 160°–200° F.

12. The process of claim 1, said dry components including vitamins and plant and animal protein sources.

13. The process of claim 1, including the step of continuously passing said feed supplement onto an endless, moving belt for cooling of the feed supplement, and thereafter transferring the cooled supplement into containers.

14. The process of claim 13, including the step of spraying water against the underside of said belt for cooling of said feed supplement thereon.

* * * * *